United States Patent [19]

Kühlthau

[11] 4,185,151
[45] * Jan. 22, 1980

[54] CATIONIC DYESTUFFS

[75] Inventor: Hans-Peter Kühlthau, Leverkusen, Fed. Rep. of Germany

[73] Assignee: Bayer Aktiengesellschaft, Leverkusen, Fed. Rep. of Germany

[*] Notice: The portion of the term of this patent subsequent to Dec. 28, 1993, has been disclaimed.

[21] Appl. No.: 751,081

[22] Filed: Dec. 16, 1976

[30] Foreign Application Priority Data

Dec. 19, 1975 [DE] Fed. Rep. of Germany ........ 2557503
Jul. 28, 1976 [DE] Fed. Rep. of Germany ........ 2633767

[51] Int. Cl.² .......................................... C07D 401/04
[52] U.S. Cl. ........................................ 546/167; 8/1 D
[58] Field of Search .................. 260/288 CE; 542/415; 546/167

[56] References Cited

U.S. PATENT DOCUMENTS 3,853,913 12/1974 Brack et al. ........................... 542/424
4,000,141 12/1976 Kühlthau ....................... 260/288 CE

FOREIGN PATENT DOCUMENTS 2351296 4/1975 Fed. Rep. of Germany .

Primary Examiner—Glennon H. Hollrah
Assistant Examiner—D. B. Springer
Attorney, Agent, or Firm—Sprung, Felfe, Horn, Lynch & Kramer

[57] ABSTRACT

Cationic dyestuffs of the formula

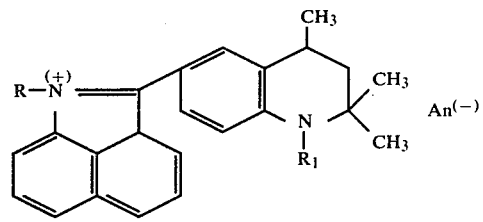

in which
R represents hydrogen, an alkyl, alkenyl, cycloalkyl or aralkyl radical,
$R_1$ represents hydrogen or an alkyl, alkenyl, cycloalkyl or aralkyl radical, with the proviso that at least one of the radicals R and $R_1$ represents a $C_2$-$C_4$-hydroxyalkyl group and $An^{(-)}$ represents an anion, and in which the cyclic and acyclic radicals can contain nonionic substituents, their preparation and their use for dyeing polyacrylonitrile, acid modified polyesters and acid modified polyamides.

5 Claims, No Drawings

CATIONIC DYESTUFFS

The invention relates to new cationic dyestuffs of the general formula

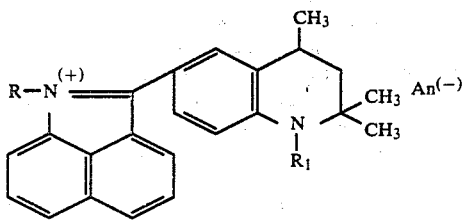

in which

R represents hydrogen, an alkyl, alkenyl, cycloalkyl or aralkyl radical, $R_1$ represents hydrogen or an alkyl, alkenyl, cycloalkyl or aralkyl radical, with the proviso that at least one of the radicals R and $R_1$ represents a $C_2$–$C_4$-hydroxyalkyl group and $An^{(-)}$ represents an anion, and in which the cyclic and acyclic radicals can contain non-ionic substituents, as well as processes for the preparation of these dyestuffs and their use for dyeing, printing and bulk dyeing of natural and synthetic materials.

In the sense of the present invention, non-ionic substituents are to be understood as the substituents which are customary in dyestuff chemistry and do not dissociate under the particular reaction conditions, such as halogen, for example fluorine, chlorine and bromine, alkyl groups, especially straight-chain or branched alkyl radicals with 1–6 C atoms, alkenyl radicals with preferably 1–4 C atoms, aralkyl radicals, alkoxy or hydroxyalkoxy radicals, especially with 1–4 C atoms, cycloalkoxy radicals, aralkoxy radicals, aryloxy radicals, aryloxyalkoxy radicals, alkylthio radicals with preferably 1–3 C atoms, aralkylthio radicals, arylthio radicals, nitro, cyano, alkoxycarbonyl, preferably with an alkoxy radical with 1–4 C atoms, the formyl radical, alkylcarbonyl radicals, especially with an alkyl group with 1–4 C atoms, arylcarbonyloxy, alkylcarbonyloxy, alkoxycarbonyloxy or alkylcarbonylamino radicals, preferably with an alkyl group with 1–4 C atoms, arylamino, alkylaminocarbonyloxy or alkylsulphonylamino radicals, preferably with an alkyl group with 1–3 C atoms, ureido, N-alkylureido, aryloxycarbonylamino, alkoxycarbonylamino, carbamoyl, N-alkylcarbamoyl, N,N-dialkylcarbamoyl, N-alkyl-N-arylcarbamoyl, sulphamoyl, N-alkylsulphamoyl, N,N-dialkylsulphamoyl, alkylsulphonyl, alkenylsulphonyl or aralkylsulphonyl radicals, arylsulphonyl, aryloxycarbonyl, alkoxysulphonyl and aryloxysulphonyl, mono-, di- or trialkylsulfamidine, alkyl-aryl-sulfamidine, alkylarylsulfamidine groups, the alkyl radicals mentioned preferably containing 1–4 C atoms. The preferred aryl is phenyl, the preferred aralkyl is benzyl, and the preferred cycloalkyl is cyclohexyl.

Preferred dyestuffs of the formula I are those which correspond to the formula

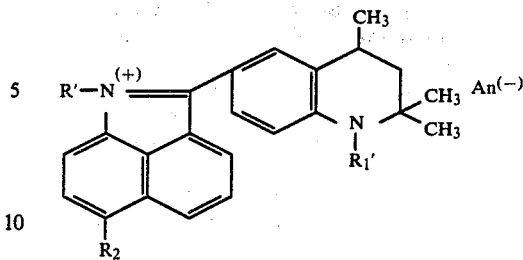

in which

R' represents $C_1$–$C_6$-alkyl radicals, which can be substituted by 1–3 halogen, $C_1$–$C_4$-alkoxy, cyano, $C_1$–$C_4$-alkylcarbonyloxy, hydroxy-$C_1$–$C_4$-alkoxy, aminocarbonyl, carboxy, $C_1$–$C_4$-alkoxycarbonyl or $C_3$- or $C_4$-alkenyloxy radicals, or represents $C_2$–$C_4$-alkenyl radicals, which can be monosubstituted or disubstituted by halogen, or represents cyclohexyl or benzyl and $R_1'$ represents hydrogen or one of the radicals mentioned under R', with the proviso that at least one of the radicals R' and $R_1'$ represents a $C_2$–$C_4$-hydroxyalkyl radical, and $R_2$ represents hydrogen, $C_1$–$C_4$-alkyl, halogen, $C_1$- or $C_2$-alkoxy, cyano, aminocarbonyl, $C_1$–$C_4$-alkoxycarbonyl, $C_1$–$C_4$-alkylsulphonyl, $C_1$–$C_4$-monoalkylaminosulphonyl or dialkylaminosulphonyl, or a radical of the formula

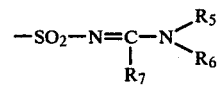

in which $R_5$ is $C_1$–$C_4$-alkyl, $R_6$ is $C_1$–$C_4$-alkyl; phenyl, which can be substituted by 1–3 halogen, $C_1$–$C_4$-alkyl or $C_1$–$C_4$-alkoxy; benzyl or cyclohexyl, or $R_5$ and $R_6$ form together with the nitrogen morpholine, piperazine or pyrrolidine, $R_7$ is hydrogen or $C_1$–$C_4$-alkyl and $An^{(-)}$ represents an anion.

Dyestuffs to be singled out are those of the formula (II), in which

R' represents $C_1$–$C_4$-alkyl, trifluoromethyl, chloroethyl, bromoethyl, methoxyethyl, cyanoethyl, acetoxyethyl, hydroxyethoxyethyl, aminocarbonylethyl, carboxyethyl, γ-cyanopropyl, β-hydroxy-γ-allyloxy-n-propyl, β-hydroxy-γ-methoxy-n-propyl, β-hydroxy-γ-ethoxy-n-propyl, β-hydroxy-γ-butoxy-n-propyl, β-chloro-n-propyl, β-chloro-n-butyl, β-chloro-i-butyl, β,γ-dichloro-n-propyl, β-acetoxy-n-propyl, β-hydroxy-γ-chloro-n-propyl, vinyl, allyl, methallyl, chloroallyl, cyclohexyl or benzyl, $R_1'$ denotes hydrogen or one of the radicals mentioned for R', and in which at least one of the radicals R' and $R_1'$ is β-hydroxyethyl, β-hydroxy-n-propyl, γ-hydroxy-n-propyl, β-hydroxy-n-butyl, γ-hydroxy-n-butyl or β-hydroxy-i-butyl and $R_2$ is hydrogen or halogen.

Particularly interesting dyestuffs of the formula (II) are those in which

R' represents methyl, ethyl, n-propyl, n-butyl, β-cyanoethyl or β-chloroethyl and R₁' represents methyl, ethyl, n-propyl, n-butyl, β-chloroethyl, β-hydroxycarbonylethyl, β-methoxyethyl, β-acetoxyethyl, β-hydroxyethoxyethyl or hydrogen and in which at least one of the radicals R' and R₁' represents β-hydroxyethyl, β-hydroxy-n-propyl, γ-hydroxy-n-propyl, β-hydroxy-n-butyl, γ-hydroxy-n-butyl or β-hydroxy-i-butyl and R₂ denotes hydrogen, chlorine or bromine.

Of the last-mentioned dyestuffs, those examples in which

R₁' is β-hydroxyethyl are particularly valuable. Amongst these, those dyestuffs which carry hydrogen in the position R₂ are very particularly preferred.

Possible anionic radicals An⁻ are the organic and inorganic anions which are customary for cationic dyestuffs.

Examples of inorganic anions are fluoride, chloride, bromide and iodide, perchlorate, hydroxyl, radicals of acids containing S, such as bisulphate, sulphate, disulphate and aminosulphate; radicals of nitrogen-oxygen acids, such as nitrate; radicals of oxygen acids of phosphorus, such as dihydrogen phosphate, hydrogen phosphate, phosphate and metaphosphate; radicals of carbonic acid, such as bicarbonate and carbonate; further anions of oxygen acids and complex acids, such as methosulphate, ethosulphate, hexafluosilicate, cyanate, thiocyanate, ferrocyanide, ferricyanide, trichlorozincate and tetrachlorozincate, tribromozincate and tetrabromozincate, stannate, borate, divanadate, tetravanadate, molybdate, tungstate, chromate, bichromate and tetrafluoborate, as well as anions of esters of boric acid, such as of the glycerine ester of boric acid, and of esters of phosphoric acid, such as of methylphosphate.

Examples of organic anions are anions of saturated or unsaturated aliphatic, cycloaliphatic, aromatic and heterocyclic carboxylic acids and sulphonic acids, such as radicals of acetic acid, chloroacetic acid, cyanoacetic acid, hydroxyacetic acid, aminoacetic acid, methylaminoacetic acid, aminoethylsulphonic acid, methylaminoethylsulphonic acid, propionic acid, n-butyric acid, i-butyric acid, 2-methyl-butyric acid, 2-ethyl-butyric acid, dichloroacetic acid, trichloroacetic acid, trifluoroacetic acid, 2-chloropropionic acid, 3-chloropropionic acid, 2-chlorobutyric acid, 2-hydroxypropionic acid, 3-hydroxypropionic acid, O-ethylglycollic acid, thioglycollic acid, glyceric acid, malic acid, dodecyl-tetraethylene glycol-etherpropionic acid, 3-(nonyloxy)-propionic acid, 3-(isotridecyloxy)propionic acid, 3-(isotridecyloxy)-diethylene glycol-ether-propionic acid, the ether-propionic acid of the alcohol mixture with 6 to 10 carbon atoms, thioacetic acid, 6-benzoylamino-2-chlorocaproic acid, nonylphenol-tetraethylene glycol-ether-propionic acid, nonylphenol-diethylene glycol-ether-propionic acid, dodecyl-tetraethylene glycol-ether-propionic acid, phenoxyacetic acid, nonylphenoxyacetic acid, n-valeric acid, i-valeric acid, 2,2,2-trimethylacetic acid, n-caproic acid, 2-ethyl-n-caproic acid, stearic acid, oleic acid, ricinoleic acid, palmitic acid, n-pelargonic acid, lauric acid, a mixture of aliphatic carboxylic acids with 9 to 11 carbon atoms (Versatic Acid 911 from SHELL), a mixture of aliphatic carboxylic acids with 15 to 19 carbon atoms (Versatic Acid 1519 from SHELL), coconut fatty acid first runnings, undecanecarboxylic acid, n-tridecanecarboxylic acid and a coconut fatty acid mixture; acrylic acid, methacrylic acid, crotonic acid, propargylic acid, oxalic acid, malonic acid, succinic acid, glutaric acid, adipic acid, pimelic acid, suberic acid, azelaic acid, the isomer mixture of 2,2,4- and 2,4,4-trimethyladipic acid, sebacic acid, isosebacic acid (isomer mixture), tartaric acid, citric acid, glyoxylic acid, dimethyl ether-α,α'-dicarboxylic acid, methylene-bis-thioglycollic acid, dimethyl sulphide-α,α-dicarboxylic acid, 2,2'-dithio-di-n-propionic acid, fumaric acid, maleic acid, itaconic acid, ethylene-bis-iminoacetic acid, nitrilosulphonic acid, methanesulphonic acid, ethanesulphonic acid, chloromethanesulphonic acid, 2-chloroethanesulphonic acid and 2-hydroxyethanesulphonic acid and Mersolat, that is to say $C_8$-$C_{15}$ paraffinsulphonic acids, obtained by hydrolysis of the sulphochlorination products of the corresponding n-paraffins.

Examples of suitable anions of cycloaliphatic carboxylic acids are the anions of cyclohexanecarboxylic acid and cyclohexene-3-carboxylic acid and examples of anions of araliphatic monocarboxylic acids are anions of phenylacetic acid, 4-methylphenylacetic acid and mandelic acid.

Suitable anions of aromatic carboxylic acids are, for example, the anions of benzoic acid, 2-methylbenzoic acid, 3-methylbenzoic acid, 4-methylbenzoic acid, 4-tert.-butylbenzoic acid, 2-bromobenzoic acid, 2-chlorobenzoic acid, 3-chlorobenzoic acid, 4-chlorobenzoic acid, 2,4-dichlorobenzoic acid, 2,5-dichlorobenzoic acid, 2-nitrobenzoic acid, 3-nitrobenzoic acid, 4-nitrobenzoic acid, 2-chloro-4-nitrobenzoic acid, 6-chloro-3-nitrobenzoic acid, 2,4-dinitrobenzoic acid, 3,4-dinitrobenzoic acid, 3,5-dinitrobenzoic acid, 2-hydroxybenzoic acid, 3-hydroxybenzoic acid, 4-hydroxybenzoic acid, 2-mercaptobenzoic acid, 4-nitro-3-methylbenzoic acid, 4-aminobenzoic acid, 5-nitro-2-hydroxybenzoic acid, 3-nitro-2-hydroxybenzoic acid, 4-methoxybenzoic acid, 3-nitro-4-methoxybenzoic acid, 4-chloro-3-hydroxybenzoic acid, 3-chloro-4-hydroxybenzoic acid, 5-chloro-2-hydroxy-3-methylbenzoic acid, 4-ethylmercapto-2-chlorobenzoic acid, 2-hydroxy-3-methylbenzoic acid, 6-hydroxy-3-methylbenzoic acid, 2-hydroxy-4-methylbenzoic acid, 6-hydroxy-2,4-dimethylbenzoic acid, 6-hydroxy-3-tert.-butylbenzoic acid, phthalic acid, tetrachlorophthalic acid, 4-hydroxyphthalic acid, 4-methoxyphthalic acid, isophthalic acid, 4-chloroisophthalic acid, 5-nitro-isophthalic acid, terephthalic acid, nitroterephthalic acid and diphenyl-3,4-carboxylic acid, o-vanillic acid, 3-sulphobenzoic acid, benzene-1,2,4,5-tetracarboxylic acid, naphthaelene-1,4,5,8-tetracarboxylic acid, biphenyl-4-carboxylic acid, abietic acid, phthalic acid mono-n-butyl ester, terephthalic acid monomethyl ester, 3-hydroxy-5,6,7,8-tetrahydronaphthalene-2-carboxylic acid, 2-hydroxy-1-naphthoic acid and anthraquinone-2-carboxylic acid.

Examples of suitable anions of heterocyclic carboxylic acids are the anions of pyromucic acid, dehydromucic acid and indolyl-3-acetic acid.

Examples of suitable anions of aromatic sulphonic acids are the anions of benzenesulphonic acid, benzene-1,3-disulphonic acid, 4-chlorobenzenesulphonic acid, 3-nitrobenzenesulphonic acid, 6-chloro-3-nitrobenzenesulphonic acid, toluene-4-sulphonic acid, toluene-2-sulphonic acid, toluene-ω-sulphonic acid, 2-chlorotoluene-4-sulphonic acid, 2-hydroxybenzenesulphonic acid, n-dodecylbenzenesulphonic acid, 1,2,3,4-tetrahydronaphthalene-()-sulphonic acid, naphthalene-1-sulphonic acid, naphthalene-1,4- or -1,5-disulphonic acid, naphthalene-1,3,5-trisulphonic acid, 1-naphthol-2-sulphonic acid, 5-nitronaphthalene-2-sulphonic acid, 8-aminonaphthalene-1-sulphonic acid, stilbene-2,2'-disulphonic acid biphenyl-2-sulphonic acid.

An example of a suitable anion of heterocyclic sulphonic acids is the anion of quinoline-5-sulphonic acid.

Further, anions which can be used are those of arylsulphinic, arylphosphonic and arylphosphonous acids, such as benzenesulphinic acid and benzenephosphonic acid.

Colourless anions are preferred. For dyeing from an aqueous medium, anions which do not excessively impair the solubility of the dyestuff in water are preferred. For dyeing from organic solvents, anions which assist the solubility of the dyestuff in organic solvents or at least do not influence it adversely are preferred.

The anion is in general decided by the manufacturing process and by the purification of the crude dyestuff which may be carried out. In general the dyestuffs are in the form of halides (especially chlorides or bromides) or methosulphates, ethosulphates, sulphates, benzenesulphonates or toluenesulphonates, or acetates. The anions can be replaced by other anions in a known manner or can be introduced by the action of acids on the dyestuff bases.

The dyestuffs of the general formula (I) are obtainable according to various processes.

Process (A)

By condensation of compounds of the formula

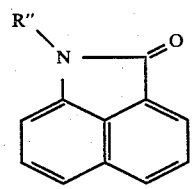

(III)

in which
R" has the meaning indicated for R under formula (I) and in which
R" and/or the naphthalene ring can contain non-ionic substituents, with a tetrahydroquinoline of the formula

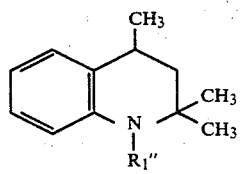

(IV)

in which
$R_1''$ has the meaning indicated for $R_1$ under formula I and wherein
$R_1''$ and the aromatic ring can contain non-ionic substituents, in a manner which is in itself known, in the presence of condensation agents, or mixtures of condensation agents, which provide an anion $An^{(-)}$. At least one of the radicals R" or $R_1''$ is a $C_2$–$C_4$-hydroxyalkyl group, of which the oxygen atom carries an acyl radical or another protective group which is split off during aqueous working up of the condensation melt at elevated temperatures.

Possible protective groups are especially $C_1$–$C_4$-alkylcarbonyl or $C_1$–$C_4$-alkyloxycarbonyl groups.

Examples of suitable condensation agents are phosphorus oxychloride, phosphorus trichloride, phosphorus pentachloride, tin tetrachloride, titanium tetrachloride and phosgene, with or without addition of aluminum chloride, phosphorus pentoxide, zinc chloride and boron fluoride. If appropriate, the condensation can be carried out in diluents which are inert under the reaction conditions, such as chlorobenzene and dichlorobenzene, toluene and xylene, at temperatures between about 50° and 150° C.

Instead of the naphtholactam-(1,8) of the formula (III), it is also possible to employ a functionally equivalent compound, for example a compound of the formula

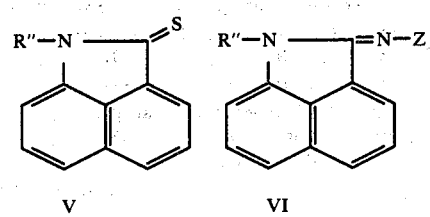

or

In the formulae V, VI and VII,
R" has the meaning indicated for R under formula I, and is subject to the abovementioned proviso,
Z is any desired radical, for example aryl, such as phenyl,
$Z_1$ is a radical which can be split off as an anion, for example an alkylmercapto group or a chlorine atom and $An_1^{(-)}$ is an anion.

A variant for the manufacture of dyestuffs of the formula I, in which
$R_1$ denotes hydrogen, is to employ, instead of the tetrahydroquinoline of the formula IV, a compound which, under the condensation conditions, can be converted into such a tetrahydroquinoline (with $R_1=H$) or can form a dyestuff which can subsequently be converted into a dyestuff of the formula (I). Examples of such compounds are acyl derivatives of the tetrahydroquinolines (IV), which react with hydrolytic splitting off of the acyl radical, or derivatives of the tetrahydroquinolines (IV), which contain protective groups on the nitrogen atom which are removable in a different manner, which is in itself known, for example the protective groups known from peptide synthesis.

Process (B)

By alkylation of compounds of the formula

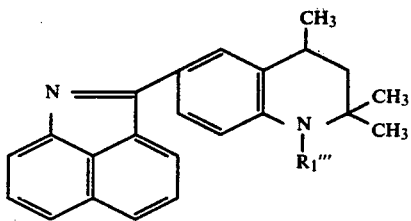

in which

R₁''' has the meaning indicated for R₁ under formula (I) or represents an acyl radical, and in which the cyclic and acyclic radicals can contain non-ionic substituents, with customary alkylating agents and—if a N-acyl compound (R₁'''=acyl) has been employed as the starting compound—by hydrolytic splitting off of the acyl radical. The acyl radical preferably has the meaning indicated in connection with formula (IV).

Examples of suitable alkylating agents are alkyl halides, such as methyl iodide, ethyl bromide, β-bromopropionitrile, ethylene chlorohydrin, β-dimethylaminoethyl chloride or β-chloroethyl methyl ether, alkenyl halides, such as allyl bromide, alkinyl halides, such as propargyl bromide, cycloalkyl halides, such as cyclohexyl bromide, aralkyl halides, such as benzyl chloride or 4-methylbenzyl bromide, alkyl sulphates, such as dimethyl sulphate or diethyl sulphate, arylsulphonic acid alkyl esters, such as toluenesulphonic acid methyl ester, ethyl ester, n-propyl ester, β-chloroethyl ester or β-cyanoethyl ester, and also, in the presence of an acid which forms the anion An⁽⁻⁾, α,β-unsaturated carboxylic acid esters, amides or nitriles, such as acrylic acid methyl ester, methacrylic acid ethyl ester, methycrylic acid amide, acrylonitrile and methacrylonitrile, as well as ethylene oxide and epoxides of the formula

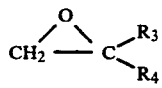

in which

R₃ represents hydrogen or methyl and

R₄ represents methyl, ethyl, chloromethyl, methoxymethyl, ethoxymethyl, propoxymethyl, butoxymethyl, allyloxymethyl, phenoxymethyl or phenyl.

The reaction is carried out in a solvent which is inert under the reaction conditions, such as benzene, toluene, xylene, chlorobenzene or dichlorobenzene, nitrobenzene, dioxane, chloroform, dimethylformamide and N-methylpyrrolidone.

Examples of suitable acids which provide the anion An⁻ are sulphuric acid, phosphoric acid, hydrochloric acid, hydrogen bromide, benzenesulphonic acid, toluenesulphonic acid, formic acid, acetic acid and propionic acid, and in the case of the alkylation with ethylene oxide or the epoxides of the formula (IX) the liquid carboxylic acids can at the same time serve as solvents.

Examples of suitable starting materials of the formula (III) are: N-methyl-, N-ethyl-, N-iso-propyl-, N-n-propyl-, N-iso-butyl-, N-n-butyl-, N-iso-amyl-, N-n-hexyl-, N-cyclohexyl-, N-2-trimethylene-, N-benzyl-, N-β-phenyl-ethyl-, N-γ-phenylpropyl-, N-phenyl-, N-4'-methylphenyl-, N-4'-methylbenzyl-, N-β-cyanoethyl-, N-β-chloroethyl-, N-β-methoxyethyl-, N-β-hydroxyethyl-, N-β-acetyloxyethyl-, N-β-acetoxy-n-propyl-, N-β-chloro-n-propyl-, N-β-hydroxy-n-propyl-, N-β-hydroxy-n-butyl-, N-β-acetoxy-n-butyl-, N-β-hydroxycarbonylethyl-, N-ethoxycarbonylmethyl- and N-allyl-naphtholactam-(1,8), their monochloro and monobromo derivatives substituted in the naphthalene ring in the p-position to the nitrogen, 4-methoxy-4-ethoxy-, 4-hydroxy-, 4-acetylamino-, 4-dimethylamino-, 4-methylsulphonyl-, 4-methylsolphonylamino-, 4-aminosulphonyl-, 4-dimethylamino-sulphonyl-, 4-cyano-, 4-methylmercapto-N-ethyl-naphtholactam-(1,8), 4,5-dichloro-N-methylnaphtholactam-(1,8), 2,4-dibromo-N-ethyl- and N-n-butyl-naphtholactam-(1,8), 6-methyl-amino-N-methyl-naphtholactam-(1,8) and 2-ethyl-N-methyl-naphtholactam-(1,8), N-ethylnaphtholactam-(1,8)-4-N,N-dimethyl-sulphamidine and N-ethylnaphtholactam-(1,8)-4-N-phenyl-N-methylsulphamidine.

Examples of suitable tetrahydroquinolines of the formula IV are 2,2,4-trimethyltetrahydroquinoline, N-methyl-2,2,4-trimethyl-tetrahydroquinoline, N-ethyl-2,2,4-trimethyltetrahydroquinoline, N-i-propyl-2,2,4-trimethyl-tetrahydroquinoline, N-n-propyl-2,2,4-trimethyl-tetrahydroquinoline, N-i-butyl-2,2,4-trimethyl-tetrahydroquinoline, N-n-butyl-2,2,4-trimethyl-tetrahydroquinoline, N-t-butyl-2,2,4-trimethyl-tetrahydroquinoline, N-i-amyl-2,2,4-trimethyl-tetrahydroquinoline, N-n-amyl-2,2,4-trimethyl-tetrahydroquinoline, N-n-hexyl-2,2,4-trimethyl-tetrahydroquinoline, N-allyl-2,2,4-trimethyl-tetrahydroquinoline, N-benzyl-2,2,4-trimethyl-tetrahydroquinoline, N-β-chloroethyl-2,2,4-trimethyl-tetrahydroquinoline, N-β-bromoethyl-2,2,4-trimethyl-tetrahydroquinoline, N-β-hydroxyethyl-2,2,4-trimethyl-tetrahydroquinoline, N-β-cyanoethyl-2,2,4-trimethyl-tetrahydroquinoline, N-β-amidocarbonylethyl-2,2,4-trimethyl-tetrahydroquinoline, N-β-methoxycarbonyloxyethyl-2,2,4-trimethyl-tetrahydroquinoline, N-β-ethoxycarbonylethyl-2,2,4-trimethyl-tetrahydroquinoline, N-β-dimethylaminoethyl-2,2,4-trimethyl-tetrahydroquinoline, N-β-methoxyethyl-2,2,4-trimethyl-tetrahydroquinoline, N-β-acetoxyethyl-2,2,4-trimethyl-tetrahydroquinoline, N-β-hydroxy-n-propyl-2,2,4-trimethyl-tetrahydroquinoline, N-β-hydroxy-n-butyl-2,2,4-trimethyl-tetrahydroquinoline, N-β-hydroxy-i-butyl-2,2,4-trimethyl-tetrahydroquinoline, N-cyclohexyl-2,2,4-trimethyl-tetrahydroquinoline, N-β-hydroxy-γ-methoxy-propyl-2,2,4-trimethyl-tetrahydroquinoline, N-β-hydroxy-γ-ethoxy-propyl-2,2,4-trimethyl-tetrahydroquinoline, N-β-hydroxy-γ-propoxy-propyl-2,2,4-trimethyl-tetrahydroquinoline, N-β-hydroxy-γ-butoxy-propyl-2,2,4-trimethyl-tetrahydroquinoline, N-β-hydroxy-γ-allyloxy-propyl-2,2,4-trimethyl-tetrahydroquinoline, N-β-hydroxy-γ-phenoxypropyl-2,2,4-trimethyl-tetrahydroquinoline, N-β-hydroxy-β-phenyl-ethyl-2,2,4-trimethyl-tetrahydroquinoline, N-β-n-amyloxy-ethyl-2,2,4-trimethyl-tetrahydroquinoline, N-β-n-butyloxy-ethyl-2,2,4-trimethyl-tetrahydroquinoline, N-β-t-butyloxy-ethyl-2,2,4-trimethyl-tetrahydroquinoline, N-β-cyclohexyloxy-ethyl-2,2,4-trimethyl-tetrahydroquinoline, N-β-benzoyloxy-ethyl-2,2,4-trimethyl-tetrahydroquinoline, N-β-(p-methoxybenzoyloxy)-ethyl-2,2,4-trimethyl-tetrahydroquinoline, N-β-(p-methoxy-carbonylbenzoyloxy)-ethyl-2,2,4-trimethyl-tetrahydroquinoline, N-β-(β'-phenyloxyethyloxy)-ethyl-2,2,4-trimethyl-tetrahydroquinoline, N-β-chloroethyl-2,2,4,8-tetramethyl-tetrahydroquinoline, 2,2,4,8-tetramethyl-tetrahydroquinoline, N-butyl- 2,2,4,8-tetramethyl-tetrahydroquinoline, N-β-hydroxyethyl-2,2,4-trimethyl-8-ethyl-tetrahydroquinoline, N-β-hyeroxyethyl-2,2,4-trimethyl-8-methoxy-tetrahydroquinoline, N-β-hydroxyethyl-2,2,4-trimethyl-8-ethoxy-tetrahydroquinoline, N-butyl-2,2,4-trimethyl-8-ethoxy-tetrahydroquinoline, N-butyl-2,2,4-trimethyl-8-ethyl-tetrahydroquinoline, N-butyl-2,2,4-trimethyl-8-methoxy-tetrahydroquinoline, 2,2,4-trimethyl-8-methoxy-tetrahydroquinoline, 2,2,4-trimethyl-8-ethoxy-tetrahydroquinoline, 2,2,4-trimethyl-8-ethyl-tetrahydroquinoline, a mixture of N-β-hydroxyethyl-2,2,4,5-tetramethyl-tetrahydroquinoline and N-β-hydroxyethyl-2,2,4,7-tetramethyl-tetrahydroquinoline, a mixture of 2,2,4,5-tetramethyl-tetrahydroquinoline and 2,2,4,7-tetramethyl-tetrahydroquinoline, a mixture of 2,2,4-trimethyl-5-methoxy-tetrahydroquinoline and 2,2,4-trimethyl-7-methoxy-tetrahydroquinoline, a mixture of 2,2,4-trimethyl-5ethoxy-tetrahydroquinoline and 2,2,4-trimethyl-7-ethoxy-tetrahydroquinoline, a mixture of 2,2,4-trimethyl-5-chloro-tetrahydroquinoline and 2,2,4-trimethyl-7-chlorotetrahydroquinoline, a mixture of N-β-hydroxyethyl-2,2,4-trimethyl-5-methoxy-tetrahydroquinoline and N-β-hydroxyethyl-2,2,4-trimethyl-7-methoxy-tetrahydroquinoline, a mixture of N-β-hydroxyethyl-2,2,4-trimethyl-5-ethoxy-tetrahydroquinoline and N-β-hydroxyethyl-2,2,4-trimethyl-7-ethoxy-tetrahydroquinoline, a mixture of N-β-hydroxyethyl-2,2,4-trimethyl-5-chloro-tetrahydroquinoline and N-β-hydroxyethyl-2,2,4-trimethyl-7-chlorotetrahydroquinoline, 2,2,4-trimethyl-5,8-dimethyl-tetrahydroquinoline, 2,2,4-trimethyl-5,8-dimethoxy-tetrahydroquinoline, 2,2,4-trimethyl-5,8-diethoxy-tetrahydroquinoline, N-β-hydroxy-2,2,4-trimethyl-5,8-dimethoxy-tetrahydroquinoline, N-β-chloroethyl-2,2,4-trimethyl-4,8-diethoxy-tetrahydroquinoline, N-β-γ-dichloropropyl-2,2,4-trimethyl-8-methoxy-tetrahydroquinoline, N-β-γ-dihydroxypropyl-2,2,4-trimethyl-8-ethoxy-tetrahydroquinoline, N-β-chloropropyl-2,2,4-trimethyl-8-ethoxy-tetrahydroquinoline, N-β-chloropropyl-2,2,4-trimethyl-8-methoxy-tetrahydroquinoline, N-β-hydroxybutyl-2,2,4-trimethyl-8-methoxy-tetrahydroquinoline, N-β-hydroxybutyl-2,2,4-trimethyl-8-ethoxy-tetrahydroquinoline, N-β-hydroxy-γ-chloropropyl-2,2,4-trimethyl-tetrahydroquinoline, N-β(N'-methylsulphonyl-N'-methylamino)-ethyl-2,2,4-trimethyl-tetrahydroquinoline, N-β-(N'-methylsulphonyl-N'-ethylamino)-ethyl-2,2,4-trimethyl-tetrahydroquinoline, N-β-acetoxy-n-propyl-2,2,4-trimethyl-tetrahydroquinoline, N-γ-acetoxy-n-propyl-2,2,4-trimethyl-tetrahydroquinoline, N-β-acetoxy-n-butyl-2,2,4-trimethyl-tetrahydroquinoline, N-β-acetoxy-i-butyl-2,2,4-trimethyl-tetrahydroquinoline, N-γ-acetoxy-n-butyl-2,2,4-trimethyl-tetrahydroquinoline, N-β-acetoxy-γ-chloro-n-propyl-2,2,4-trimethyl-tetrahydroquinoline, N-β(β'-acetoxyethoxy)-ethyl-2,2,4-trimethyl-tetrahydroquinoline, n-β(β'-hydroxyethoxy)-ethyl-2,2,4-trimethyl-tetrahydroquinoline, N-β-acetoxy-γ-methoxy-n-propyl-2,2,4-trimethyl-tetrahydroquinoline, N-β-acetoxy-γ-ethoxy-n-propyl-2,2,4-trimethyl-tetrahydroquinoline, N-β-acetoxy-γ-propoxy-n-propyl-2,2,4-trimethyl-tetrahydroquinoline, N-β-acetoxy-γ-butoxy-n-propyl-2,2,4-trimethyl-tetrahydroquinoline and N-β-acetoxy-γ-allyloxy-n-propyl-2,2,4-trimethyl-tetrahydroquinoline.

The dyestuffs can be used for dyeing, printing and bulk dyeing of materials containing acid groups, above all of products which consist entirely or predominantly of polymerised unsaturated nitriles such as acrylonitrile and vinylidene dicyanide or of acid-modified polyesters or of acid-modified polyamides. They are furthermore suitable for the other known uses of cationic dyestuffs, such as the dyeing and printing of cellulose acetate, coir, jute, sisal and silk, and of tannin-treated cotton and paper, for the preparation of ballpoint pens and rubber-stamp inks and for use in transfer printing and in flexographic printing. The dyeings and prints on the first-mentioned materials, especially on polyacryonitrile, are distinguished by their very high level of fastness, above all by very good fastness to light, wet processing, rubbing, decatising, sublimation and perspiration.

The dyestuffs exhibit a high water solubility and particular stability, in dye liquors, to extraneous ions, such as, for example, enter the dye bath in the form of thiocyanate ions during the wet spinning process.

The dyestuffs can be employed individually or as mixtures.

The dyestuffs according to the invention, and their mixtures, are very suitable for dyeing shaped articles of polymers or copolymers of acrylonitrile, asymmetrical dicyanoethylene and acid-modified aromatic polyesters in chlorohydrocarbons as the dye bath, especially if they carry substituents which assist the solubility in chlorohydrocarbons, such as, for example, the tert.-butyl group or the dodecyl group, or if the anion An⁻ is the anion of a monobasic organic acid with <30 carbon atoms.

The parts indicated in the Examples are parts by weight.

EXAMPLE 1

19.9 parts of N-β-acetoxyethyl-2,2,4-trimethyl-tetrahydroquinoline are stirred with 30 parts of phosphorus oxychloride and 10 parts of phosphorus pentoxide, the mixture is warmed to 65° C. and at this temperature a melt of 15 parts of N-ethylnaphtholactam is added dropwise. The condensation mixture is then kept at 65° C. for 6 hours, after which it is stirred into 300 parts of water. The aqueous solution is heated to 90°–95° C. and is stirred for 20 minutes at this temperature. It is then clarified, using 5 parts of active charcoal, and is cooled, and the dyestuff is precipitated with sodium chloride. It has the formula

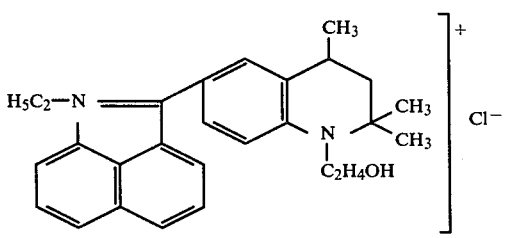

and dyes materials of acid-modified polyesters, polyacrylonitrile or acid-modified polyamides in clear blue shades which are distinguished by very good fastness properties.

If, in the process of preparation described above, the equivalent amount of a tetrahydroquinoline of the formula

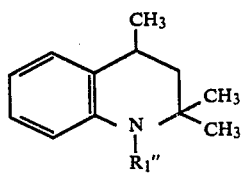
was used instead of N-β-acetoxyethyl-2,2,4-trimethyl-tetrahydroquinoline and the equivalent amount of a naphtholactam of the formula
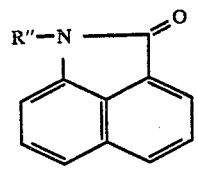
was used instead of N-ethylnaphtholactam, equivalent dyestuffs of the formula
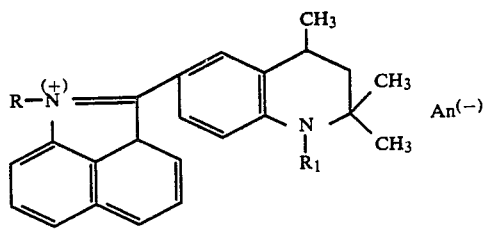
were obtained, the substituents of which, and the colour shade of which on polyacrylonitrile, are indicated in the Table which follows.

| Example No. | R'' | R₁'' | R | R₁ | Colour shade on polyacrylonitrile |
|---|---|---|---|---|---|
| 2 | —C₂H₅ | —CH₂—CH(OCO—CH₃).CH₃ | —C₂H₅ | —CH₂—CHOH—CH₃ | blue |
| 3 | —C₂H₅ | —CH₂—CH₂—CH₂—O.COCH₃ | —C₂H₅ | —CH₂—CH₂—CH₂OH | blue |
| 4 | —C₂H₅ | —CH₂—CH(O—COCH₃).C₂H₅ | —C₂H₅ | —CH₂.CHOH.C₂H₅ | blue |
| 5 | —C₂H₅ | —CH₂.CH₂.O.CH₂.CH₂.O.CO.CH₃ | —C₂H₅ | —CH₂.CH₂.O.C₂H₄OH | blue |
| 6 | —C₂H₅ | —CH₂.CH₂.O.CH₂.CH₂.O.COCH₃ | —CH₃ | —C₂H₄.O.C₂H₄OH | blue |
| 7 | —CH₃ | —C₂H₄O.COCH₃ | —CH₃ | —C₂H₄OH | blue |
| 8 | —CH₃ | —CH₂.CH(O.CO.CH₃).CH₃ | —CH₃ | —CH₂.CHOH.CH₃ | blue |
| 9 | —CH₃ | —CH₂.CH₂.CH₂.O.COCH₃ | —CH₃ | —CH₂.CH₂.CH₂OH | blue |
| 10 | —CH₃ | —CH₂.CH(OCOCH₃).C₂H₅ | —CH₃ | —CH₂.CHOH.C₂H₅ | blue |
| 11 | —CH₃ | —CH₂.CH₂.CH₂.OCOCH₃ | —CH₃ | —CH₂.CH₂.CH₂.O.H | blue |
| 12 | —C₂H₅ | —CH₂—C(OCOCH₃)(CH₃)₂ | —C₂H₅ | —CH₂COH(CH₃)₂ | blue |
| 13 | —C₂H₅ | —CH₂—CH(OCOCH₃).CH₂Cl | —C₂H₅ | —CH₂COH(CH₃)₂ | blue |
| 14 | —CH₃ | —CH₂—CH(OCOCH₃).CH₂Cl | —C₂H₅ | —CH₂.CHOH.CH₂Cl | blue |
| 15 | —CH₃ | —CH₂—CH₂OCOCH₃ | —CH₃ | —CH₂—CH₂OH | blue |
| 16 | —C₂H₄OH | —CH₂—CH₂OCOCH₃ | —C₂H₄Cl | —CH₂—CH₂OH | blue |
| 17 | —C₂H₄Cl | —CH₂—CH₂OCOCH₃ | —C₂H₄Cl | —CH₂—CH₂OH | blue |
| 18 | —CH₂—CHOH—CH₃ | —C₂H₄OCOCH₃ | —CH₂—CHCl—CH₃ | —C₂H₄OH | blue |
| 19 | —CH₂—CHCl—CH₃ | —C₂H₄OCOCH₃ | —CH₂—CHCl—CH₃ | —C₂H₄Cl | blue |
| 20 | —CH₂—CH(OCOCH₃)—CH₃ | —C₂H₄OH | —CH₂—CHOH—CH₃ | —C₂H₄Cl | blue |
| 21 | —C₂H₄O—COCH₃ | —C₂H₄OH | —C₂H₄OH | —C₂H₄Cl | blue |
| 22 | —C₂H₄O—COCH₃ | —C₂H₄OH | —C₂H₄OH | —C₂H₄Cl | blue |
| 23 | —C₂H₄O—COCH₃ | —C₂H₄O—COCH₃ | —C₂H₄OH | —C₂H₄OH | blue |
| 24 | —CH₂—CH(OCOCH₃)—CH₃ | —C₂H₄O—COCH₃ | —CH₂—CHOH—CH₃ | —C₂H₄OH | blue |
| 25 | —C₂H₄O—COCH₃ | —CH₃ | —C₂H₄OH | —CH₃ | blue |
| 26 | —C₂H₄O—COCH₃ | —C₂H₅ | —C₂H₄OH | —C₂H₅ | blue |
| 27 | —C₂H₄O—COCH₃ | —C₂H₄OCH₃ | —C₂H₄OH | —C₂H₄OCH₃ | blue |
| 28 | —C₂H₄O—COCH₃ | —C₃H₇ | —C₂H₄OH | —C₃H₇ | blue |
| 29 | —C₂H₄O—COCH₃ | —n—C₄H₉ | —C₂H₄OH | —n—C₄H₉ | blue |
| 30 | —CH₂—CH(O—COCH₃)—CH₃ | —C₂H₅ | —CH₂—CHOH—CH₃ | —C₂H₅ | blue |
| 31 | —CH₂—CH(O—COCH₃)—CH₃ | n—C₄H₉ | —CH₂—CHOH—CH₃ | —C₄H₉ | blue |
| 32 | —CH₂—CH(O—COCH₃)—CH₃ | —H | —CH₂—CHOH—CH₃ | —H | reddish-tinged blue |
| 33 | —C₂H₄O—COCH₃ | —H | —C₂H₄OH | —H | reddish-tinged blue |
| 34 | —C₂H₄CN | —C₂H₅ | —C₂H₄CN | —C₂H₅ | blue |
| 35 | —C₂H₄—CH₂—O—COCH₃ | —C₂H₅ | —CH₂—CH₂—CH₂- OH | —C₂H₅ | blue |
| 36 | —CH CH(O—COCH₂)—C₂H₅ | —C₂H₅ | —CH₂—CHOH—C₂H₅ | —C₂H₅ | blue |
| 37 | —CH₂—CH₂—CH₂—CH₂O—COCH₃ | —C₂H₅ | —CH₂—CH₂—CH₂- CH₂OH | —C₂H₅ | blue |
| 38 | —C₃H₇ | —C₂H₄—O—COCH₃ | —C₃H₇ | —C₂H₄OH | blue |
| 39 | nC₄H₉ | —C₂H₄—O—COCH₃ | n—C₄H₉ | —C₂H₄OH | blue |
| 40 | —CH₂—CH=CH₂ | —C₂H₄—O—COCH₃ | —CH₂—CH=CH₂ | —C₂H₄OH | blue |
| 41 | —CH₂—CH₂O—COCH₃ | —CH₂—CH=CH₂ | —CH₂—CHCl—CH₂- | —C₂H₄OH | blue |
| 42 | —CH₂—CHOH—CH₂—OCH₃ | —C₂H₄O—COCH₃ | OCH₃ —CH₂—CHOH—CH- ₂—OCH₃ | —CH₂—CH=CH₂ | blue |
| 43 | —CH₂—CH(OCOCH₃)—CH₂—OCH₃ | —C₂H₄OH | —CH₂—CHOH—CH- ₂—OC₂H₅ | —C₂H₄Cl | blue |
| 44 | —CH₂—CH(O—COCH₃)—CH₂—OC₂H₅ | —C₂H₄O—COCH₃ | —C₂H₅ | —C₂H₄OH | blue |
| 45 | —C₂H₅ | —C₂H₄—O—C₂H₄O—COCH₃ | —C₂H₅ | —C₂H₄O—C₂H₄OH | blue |
| 46 | —CH₃ | —C₂H₄—O.C₂H₄O.COCH₃ | —CH₃ | —C₂H₄O.C₂H₄OH | blue |

-continued

| Example No. | R'' | R₁'' | R | R₁ | Colour shade on polyacrylonitrile |
|---|---|---|---|---|---|
| 47 | —CH₂—C₆H₅ | —C₂H₄.O.COCH₃ | —CH₂—C₆H₅ | —C₂H₄OH | blue |
| 48 | —C₂H₅ | —C₂H₄.O.CO.C₂H₅ | —C₂H₅ | —C₂H₄—OH | blue |
| 49 | —C₂H₅ | —C₂H₄.O.CO—OC₂H₅ | —C₂H₅ | —C₂H₄—OH | blue |

EXAMPLE 50

13.8 parts of 4-bromo-N-ethylnaphtholactam and 13.1 parts of N-β-acetoxyethyl-2,2,4-trimethyltetrahydroquinoline are stirred with 30 parts of phosphoryl chloride, 10 parts of phosphorus pentoxide are added, and this mixture is warmed to 85° C. and is then kept at this temperature for 3 hours. The hot melt is then stirred into 400 parts of water and the resulting blue solution is heated to 90° C. and is stirred for 30 minutes at 90° to 95° C. 5 parts of active charcoal are then added, the mixture is clarified at 95°–100° and thereafter the dyestuff is salted out with sodium chloride.

The dyestuff crystallises as a salt of the formula

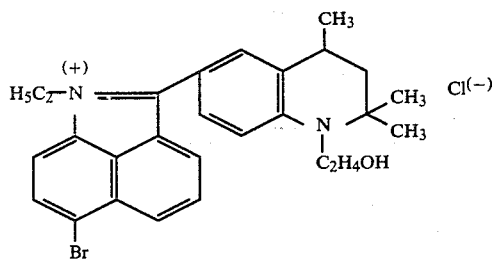

and gives clear blue dyeings, having very good fastness properties, on materials of polyacrylonitrile, acid-modified polyesters and acid-modified polyamides.

If, in the process of preparation described above, the equivalent amount of a naphtholactam of the formula

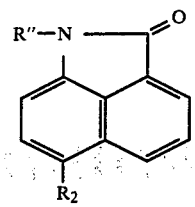

was used instead of 4-bromo-N-ethylnaphtholactam-(1,8) and the equivalent amount of a tetrahydroquinoline of the formula

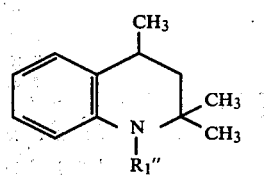

was used instead of N-β-acetoxyethyl-2,2,4-trimethyltetrahydroquinoline, equivalent dyestuffs of the formula

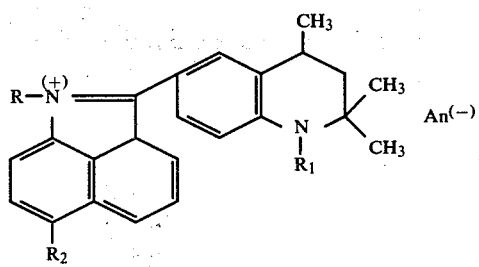

were obtained. The Table which follows shows not only the colour shade of these dyestuffs on polyacrylonitrile, but also their substituents and the substituents of the starting materials.

| Example No. | R₂ | R'' | R₁'' | R | R₁ | Colour shade on polyacrylomitrile |
|---|---|---|---|---|---|---|
| 51 | —Br | —CH₃ | —C₂H₄O . COCH₃ | —CH₃ | —C₂H₄OH | blue |
| 52 | —Cl | —CH₃ | —C₂H₄O . COCH₃ | —CH₃ | —C₂H₄OH | blue |
| 53 | —Cl | —C₂H₅ | —C₂H₄O . COCH₃ | —C₂H₅ | —C₂H₄OH | blue |
| 54 | —SO₂ . CH₃ | —C₂H₅ | —C₂H₄O . COCH₃ | —C₂H₅ | —C₂H₄OH | blue |
| 55 | —SO₂ . C₂H₅ | —C₂H₅ | —C₂H₄O . COCH₃ | —C₂H₅ | —C₂H₄OH | blue |
| 56 | —SO₂NH . C₂H₅ | —C₂H₅ | —C₂H₄O . COCH₃ | —C₂H₅ | —C₂H₄OH | blue |
| 57 | —SO₂ . N(CH₃)₂ | —C₂H₅ | —C₂H₄O . COCH₃ | —C₂H₅ | —C₂H₄OH | blue |
| 58 | —SO₂ . N(CH₃)₂ | —CH₃ | —C₂H₄O . COCH₃ | —CH₃ | —C₂H₄OH | blue |
| 59 | —SO₂ . NH . CH₃ | —CH₃ | —C₂H₄O . COCH₃ | —CH₃ | —C₂H₄OH | blue |
| 60 | —SO₂ . C₂H₅ | —CH₃ | —C₂H₄O . COCH₃ | —CH₃ | —C₂H₄OH | blue |
| 61 | —SO₂—CH₃ | —CH₃ | —C₂H₄O . COCH₃ | —CH₃ | —C₂H₄OH | blue |
| 62 | —Br | —CH₃ | —C₂H₄ . CH₂ . O . COCH₃ | —CH₃ | —C₂H₄ . CH₂OH | blue |
| 63 | —Cl | —CH₃ | —CH₂—CH(OCOCH₃) . CH₃ | —CH₃ | —CH₂ . CHOH . CH₃ | blue |
| 64 | —Br | —CH₃ | —CH₂—CH(OCO . CH₃) . CH₃ | —CH₃ | —CH₂ . CHOH . CH₃ | blue |
| 65 | —Br | —CH₂—CH₂—O—COCH₃ | —C₂H₅ | —C₂H₄OH | —C₂H₅ | blue |
| 66 | —Cl | —CH₂—CH₂—O—COCH₃ | —C₂H₅ | —C₂H₄OH | —C₂H₅ | blue |
| 67 | —Cl | —C₂H₄O—COCH₃ | —C₂H₄OH | —C₂H₄OH | —C₂H₄Cl | blue |
| 68 | —Cl | —C₂H₄O—COCH₃ | —C₂H₄—O—COCH₃ | —C₂H₄OH | —C₂H₄OH | reddish-tinged blue |
| 69 | —Cl | —C₂H₄O—COCH₃ | —H | —C₂H₄OH | —H | reddish-tinged blue |
| 70 | —Br | —C₂H₄O—COCH₃ | —H | —C₂H₄OH | —H | blue |
| 71 | —Br | —C₂H₄O—COCH₃ | —C₂H₄O—COCH₃ | —C₂H₄OH | —C₂H₄OH | blue |
| 72 | —Br | —C₂H₄O—COCH₃ | —C₂H₄Cl | —C₂H₄OH | —C₂H₄Cl | blue |
| 73 | —Br | —C₂H₅ | —C₂H₄—O—C₂H₄—O—COCH₃ | —C₂H₅ | —C₂H₄O—C₂H₄OH | blue |
| 74 | —Cl | —C₂H₅ | —C₂H₄—O—C₂H₄—O—COCH₃ | —C₂H₅ | —C₂H₄O—C₂H₄OH | blue |
| 75 | —Cl | —CH₃ | —C₂H₄—O—C₂H₄—O—COCH₃ | —CH₃ | —C₂H₄O—C₂H₄OH | blue |
| 76 | —Br | —CH₃ | —C₂H₄—O—C₂H₄—O—COCH₃ | —CH₃ | —C₂H₄O—C₂H₄OH | blue |
| 77 | —Cl | —C₂H₅ | —CH₂—CH(OCO—CH₃)—C₂H₅ | —C₂H₅ | —CH₂CHOH—C₂H₅ | blue |
| 78 | —Br | —C₂H₅ | —CH₂—CH₂—CH₂—CH₂O—COCH₃ | —C₂H₅ | —CH₂—CH₂—CH₂—CH₂OH | blue |
| 79 | —Br | —C₂H₄CN | —C₂H₄O . COCH₃ | —C₂H₄CN | —C₂H₄OH | blue |
| 80 | —Br | Cyclohexyl | —C₂H₄O . COCH₃ | Cyclohexyl | —C₂H₄OH | blue |
| 81 | —Cl | —C₄H₉ | —C₂H₄O . COCH₃ | —C₄H₉ | —C₂H₄OH | blue |
| 82 | —Br | —CH₂—CH=CH₂ | —C₂H₅ | —CH₂—CH=CH₂ | —C₂H₅ | blue |
| 83 | —Cl | —i-C₃H₇ | —CH₃ | —i-C₃H₇ | —C₂H₄OH | blue |
| 84 | —Br | —n-C₃H₇ | —CH₃ | —n-C₃H₇ | —C₂H₄OH | blue |
| 85 | —Cl | —C₂H₄OH | —C₂H₄O . COCH₃ | —C₂H₄Cl | —C₂H₄OH | blue |
| 86 | —Br | —C₂H₄OH | —C₂H₄O . COCH₃ | —C₂H₄Cl | —C₂H₄OH | blue |
| 87 | —OCH₃ | —C₂H₅ | —C₂H₄OCOCH₃ | —C₂H₅ | —C₂H₄OH | blue |
| 88 | —CH₃ | —C₂H₅ | —C₂H₄OCOCH₃ | —C₂H₅ | —C₂H₄OH | blue |
| 89 | —CN | —C₂H₅ | —C₂H₄OCOCH₃ | —C₂H₅ | —C₂H₄OH | blue |
| 90 | —CONHCH₃ | —C₂H₅ | —C₂H₄OCOCH₃ | —C₂H₅ | —C₂H₄OH | blue |
| 91 | —COOCH₃ | —C₂H₅ | —C₂H₄OCOCH₃ | —C₂H₅ | —C₂H₄OH | blue |
| 92 | —SO₂—N=CH—N(CH₃)(CH₃) | —C₂H₅ | —C₂H₄—O—COCH₃ | —C₂H₅ | —C₂H₄—OH | " |

-continued

| Example No. | R₂ | R″ | R₁″ | R | R₁ | Colour shade on polyacrylonitrile |
|---|---|---|---|---|---|---|
| 93 | —SO₂—N=CH—N(—C₆H₅)(—CH₃) | | | | | " |
| 94 | " | —C₂H₄—O—COCH₃ | —C₂H₅ | —C₂H₅ | —C₂H₅ | " |
| 95 | " | " | —H | " | —H | " |
| 96 | " | " | —C₂H₄—OH | " | —C₂H₄—Cl | " |
| 97 | " | " | —C₂H₄—O—COCH₃ | " | —C₂H₄—OH | " |
| 98 | —SO₂—N=CH—N(—CH₃)(—CH₃) | —CH₂—C₆H₅ | —CH₂—C₆H₅ | —CH₂—C₆H₅ | " | " |
| 99 | —SO₂—N=CH—N(—C₂H₅)(—C₂H₅) | —CH₃ | —CH₃ | —CH₃ | —CH₃ | " |
| 100 | —SO₂—N=CH—N(—C₆H₅)(—CH₃) | —C₂H₄—O—COCH₃ | —C₂H₄—O—COCH₃ | —C₂H₄—OH | —C₂H₄—OH | " |
| 101 | —SO₂—N=CH—N(—CH₃)(—CH₃) | —C₂H₄—O—COCH₃ | —C₂H₄—O—COCH₃ | —C₂H₄—OH | —C₂H₄—OH | " |
| 102 | —SO₂—N=CH—N(morpholino) | —C₂H₅ | —CH₂—C₆H₅ | —C₂H₅ | —CH₂—C₆H₅ | " |
| 103 | —SO₂—N=CH—N(cyclohexyl)(—CH₃) | " | " | " | " | " |
| 104 | —SO₂—N=CH—N(—CH₃)(—CH₃) | —C₂H₄—CN | —C₂H₄—CN | —C₂H₄—CN | —C₂H₄—OH | " |
| 105 | —SO₂—N=CH—N(piperazino) | —C₂H₅ | —C₂H₅ | —C₂H₅ | C₂H₄—OH | " |

EXAMPLE 106

169 parts of naphtholactam-(1,8) are introduced gradually, whilst stirring, into a mixture of 26.1 parts of N-β-acetoxyethyl-2,2,4-trimethyl-tetrahydroquinoline and 40 g of phosphorus oxychloride at 60° C.

The melt is then stirred for a further 6 hours at 60° C., after which it is stirred into 400 ml of ice water, the pH value of which is constantly kept neutral by addition of sodium bicarbonate. As soon as all the phosphorus oxychloride has been hydrolysed, the dyestuff base is filtered off and dried in vacuo. 10 parts of the dyestuff base thus prepared are stirred with 20 parts of glacial acetic acid, the solution is warmed to 85° C. and ethylene oxide is passed in, at this temperature, until the reaction, which can be followed readily in a thin layer chromatogram, has ended. The solution is then diluted with 200 parts of water, 40 parts of sodium chloride are added and the suspension obtained is then brought to pH 1-2 with hydrochloric acid. The dyestuff is separated off and dried. It corresponds to the formula

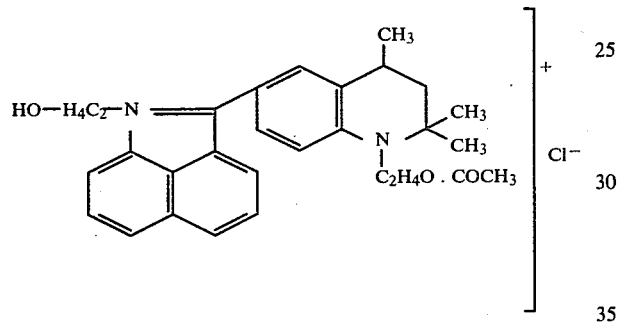

and dyes materials on polyacrylonitrile and acid-modified polyesters in a blue colour shade having very good fastness properties.

EXAMPLE 107

The procedure of Example 106 is first followed. The condensation melt, whilst still hot, is not poured out onto ice water, but onto 300 parts of water at room temperature. This mixture is warmed to 90° C. and is stirred for 10 minutes at 90° C., and the resulting solution is clarified with 5 parts of active charcoal. The filtrate obtained is brought to pH 9 with dilute sodium hydroxide solution. The dyestuff base which has precipitated is separated off and dried in vacuo.

If the dyestuff base, thus prepared, is treated with ethylene oxide analogously to the process indicated in Example 92, and the further procedure followed is as indicated there, the dyestuff of the formula

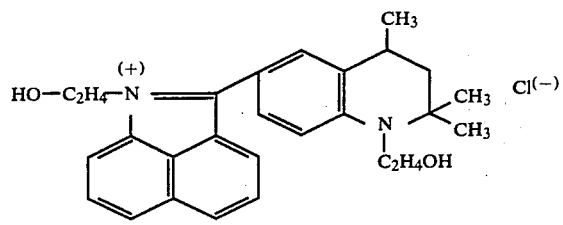

is obtained. It is identical with the product obtained in Example 23. It dyes materials of polyacrylonitrile and acid-modified polyesters in a blue colour shade having very good fastness properties.

If naphtholactam-(1,8) is condensed, analogously to the procedure described in Example 106, with the tetrahydroquinolines of the formula

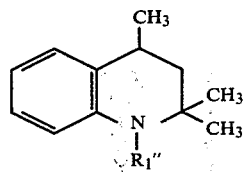

indicated in the Table which follows, and the further procedure is carried out with the alkylating agents indicated, dyestuffs of the formula

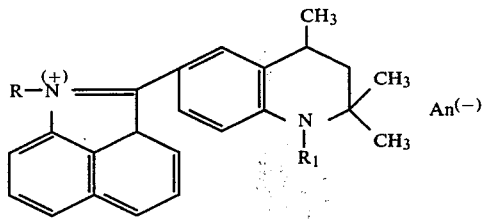

are obtained, the substituents of which, and colour shade of which on PAN, are also contained in the Table. The dyestuffs are in part also obtainable in accordance with the process described in Example 1, and are in part contained in the Table which follows Example 1.

| Example No. | $R_1''$ | quaternised with | R | $R_1$ | Colour shade on polyacrylonitrile |
|---|---|---|---|---|---|
| 108 | —C$_2$H$_4$O COCH$_3$ | propylene oxide | —CH$_2$ CHOH CH$_3$ | —C$_2$H$_4$O COCH$_3$ | blue |
| 109 | —C$_2$H$_4$O COCH$_3$ | butylene oxide | —CH$_2$ CHOH CH$_2$ CH$_3$ | —C$_2$H$_4$O COCH$_3$ | blue |
| 110 | —C$_2$H$_5$ | ethylene oxide | —C$_2$H$_4$OH | —C$_2$H$_5$ | blue |
| 111 | —CH$_3$ | ethylene oxide | —C$_2$H$_4$OH | —CH$_3$ | blue |
| 112 | —C$_2$H$_4$OH | ethylene oxide | —C$_2$H$_4$ OH | —C$_2$H$_4$Cl | blue |
| 113 | —C$_4$H$_9$ | ethylene oxide | —C$_2$H$_4$OH | —C$_4$H$_9$ | blue |
| 114 | —C$_2$H$_5$ | propylene oxide | —CH$_2$—CHOH CH$_3$ | —C$_2$H$_5$ | blue |
| 115 | —C$_2$H$_5$ | butylene oxide | —CH$_2$—CHOH CH$_2$ CH$_3$ | —C$_2$H$_5$ | blue |
| 116 | —C$_2$H$_4$Cl | ethylene oxide | —C$_2$H$_4$OH | —C$_2$H$_4$Cl | blue |
| 117 | —C$_2$H$_4$O C$_2$H$_4$OH | ethylene oxide | —C$_2$H$_4$OH | —C$_2$H$_4$O C$_2$H$_4$Cl | blue |
| 118 | —C$_2$H$_4$OCH$_3$ | ethylene oxide | —C$_2$H$_4$OH | —C$_2$H$_4$OCH$_3$ | blue |
| 119 | —C$_2$H$_4$O COOCH$_3$ | ethylene oxide | —C$_2$H$_4$OH | —C$_2$H$_4$O COOCH$_3$ | blue |

The dyestuffs 108 to 119 are also obtained in accordance with the process indicated in Example 107. Furthermore, the following dyestuffs are obtained in accordance with the process described in Example 107:

| Example No. | $R_1''$ | quaternised with | R | $R_1$ | Colour shade on polyacrylonitrile |
|---|---|---|---|---|---|
| 120 | $-C_2H_4OCOCH_3$ | propylene oxide | $-CH_2-CHOH\ CH_3$ | $-C_2H_4OH$ | blue |
| 121 | $-C_2H_4OCOCH_3$ | butylene oxide | $-CH_2-CHOH\ CH_2\ CH_3$ | $-C_2H_4OH$ | blue |
| 122 | $-C_2H_4O\ COOCH_3$ | ethylene oxide | $-C_2H_4OH$ | $-C_2H_4OH$ | blue |

EXAMPLE 123

A polyacrylonitrile fabric is printed with a printing paste which has been prepared as follows:

30 parts of the dyestuff described in Example 1, 50 parts of thiodiethylene glycol, 30 parts of cyclohexanol and 30 parts of 30% strength acetic acid are covered with 330 parts of hot water and the resulting solution is added to 500 parts of crystal gum (gum arabic as a thickener). Finally, 30 parts of zinc nitrate solution are also added. The resulting print is dried, steamed for 30 minutes and then rinsed. A blue print having very good fastness properties is obtained.

EXAMPLE 124

Acid-modified polyethylene glycol terephthalate fibres are introduced, using a liquor ratio of 1:40, into an aqueous bas, at 20° C., which contains, per liter, 3 to 10 g of sodium sulphate, 0.1 to 1 g of oleyl polyglycol ether (50 mols of ethylene oxide per mol of oleyl alcohol), 0-15 g of dimethylbenzyldodecylammonium chloride and 0.15 g of the dyestuff described in Example 2, and which has been adjusted to pH 4-5 with acetic acid. The bath is heated to 100° C. over the course of 30 minutes and is kept at this temperature for 60 minutes. The fibres are then rinsed and dried. A blue dyeing having very good fastness properties is obtained.

EXAMPLE 125

Polyacrylonitrile fibres are introduced, using a liquor ratio of 1:40, into an aqueous bath at 40° C., which contains, per liter, 0.75 g of 30% strength acetic acid, 0.38 g of sodium acetate and 0.15 g of the dyestuff described in Example 1. The bath is heated to the boil over the course of 20-30 minutes and is kept at this temperature for 30-60 minutes. After rinsing and drying, a blue dyeing having very good fastness properties is obtained.

EXAMPLE 126

A stock solution is prepared from 15 parts by weight of the dyestuff mentioned in Example 1, 15 parts by weight of polyacrylonitrile and 70 parts by weight of dimethylformamide, and is added to a customary polyacrylonitrile spinning solution, which is spun in a known manner. A blue dyeing having very good fastness properties is obtained.

EXAMPLE 127

Acid-modified synthetic polyamide fibres are introduced using a liquor ratio of 1:40, into an aqueous bath, at 40° C., which contains, per liter, 10 g of sodium acetate, 1 to 5 g of oleyl polyglycol ether (50 mols of ethylene oxide per mol of oleyl alcohol) and 0.3 g of the dyestuff described in Example 1, and which has been adjusted to ph 4-5 with acetic acid. The bath is heated to 98° C. over the course of 30 minutes and is kept at this temperature. The fibres are then rinsed and dried. A blue dyeing is obtained.

I claim:

1. Cationic dyestuffs of the formula

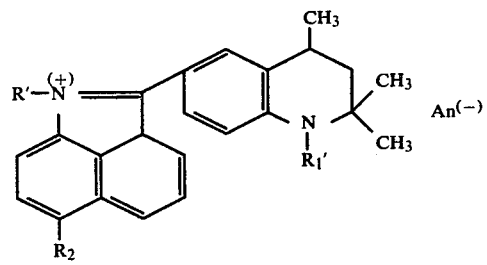

wherein

R' is $C_1-C_6$-alkyl;

$R_1'$ is β-hydroxyethyl; β-hydroxy-n-propyl; γ-hydroxy-n-propyl; β-hydroxy-n-butyl; γ-hydroxy-n-butyl; or β-hydroxy-i-butyl;

$R_2$ is hydrogen or halogen; and $An^{(-)}$ is an anion.

2. Cationic dyestuff of claim 1, wherein R' is methyl, ethyl, n-propyl, n-butyl, and $R_2$ is hydrogen, bromine, or chlorine.

3. Cationic dyestuff of claim 2 wherein $R_1'$ is β-hydroxyethyl.

4. Cationic dyestuff of claim 3, wherein $R_2$ is hydrogen.

5. Cationic dyestuff of claim 1, wherein R' is ethyl, $R_1'$ is $C_2H_4OH$ or $CH_2CHOHCH_3$, and $R_2$ is hydrogen or bromine.

* * * * *